(12) United States Patent
Leonardo

(10) Patent No.: US 11,487,365 B2
(45) Date of Patent: Nov. 1, 2022

(54) ELECTRONIC APPARATUS FOR REPOSITIONING AND TRANSITIONING AMONG INPUT DEVICES

(71) Applicant: Christian Ryan Umali Leonardo, Hong Kong (HK)

(72) Inventor: Christian Ryan Umali Leonardo, Hong Kong (HK)

( * ) Notice: Subject to any disclaimer, the term of this patent is extended or adjusted under 35 U.S.C. 154(b) by 0 days.

(21) Appl. No.: 17/227,292

(22) Filed: Apr. 10, 2021

(65) Prior Publication Data

US 2022/0244793 A1    Aug. 4, 2022

Related U.S. Application Data

(60) Provisional application No. 63/144,994, filed on Feb. 3, 2021, provisional application No. 63/145,393, filed on Feb. 3, 2021.

(51) Int. Cl.
*G06F 3/02* (2006.01)

(52) U.S. Cl.
CPC .......... *G06F 3/0202* (2013.01); *G06F 3/0213* (2013.01)

(58) Field of Classification Search
CPC .............................. G06F 3/0202; G06F 3/0213
See application file for complete search history.

(56) References Cited

U.S. PATENT DOCUMENTS

| | | | |
|---|---|---|---|
| 5,122,786 A * | 6/1992 | Rader | B41J 5/10 248/917 |
| 5,351,066 A * | 9/1994 | Rucker | B41J 5/105 341/20 |
| 5,426,449 A | 6/1995 | Danziger | |
| 5,481,263 A * | 1/1996 | Choi | G06F 1/1666 400/489 |
| 5,982,612 A * | 11/1999 | Roylance | G06F 1/1622 400/489 |
| 6,025,986 A * | 2/2000 | Sternglass | G06F 1/1616 248/118.1 |
| 6,084,576 A | 7/2000 | Leu et al. | |
| 6,538,761 B1 * | 3/2003 | Yokono | G06F 21/6218 358/1.15 |
| 6,630,924 B1 | 10/2003 | Peck | |
| 10,222,872 B1 | 3/2019 | Morrison et al. | |

(Continued)

FOREIGN PATENT DOCUMENTS

| CN | 1439124 A | 8/2003 |
|---|---|---|
| CN | 201616071 U | 10/2010 |

(Continued)

OTHER PUBLICATIONS

Search report from China Patent Office dated Oct. 8, 2021.

(Continued)

*Primary Examiner* — Ariel A Balaoing
(74) *Attorney, Agent, or Firm* — Renner, Kenner, Greive, Bobak, Taylor & Weber

(57) ABSTRACT

An electronic apparatus that comprises at least a repositioning mechanism wherein at least one of said repositioning mechanisms alternately repositions for use and disuse at least an input device such that user can transition from using at least one of said input devices to using at least another one of said input devices even while both palms remain continuously engaged to their locations.

14 Claims, 9 Drawing Sheets

(56) References Cited

U.S. PATENT DOCUMENTS

| | | | |
|---|---|---|---|
| 2003/0157957 A1* | 8/2003 | Wendorff | H04M 1/0247 455/550.1 |
| 2003/0206394 A1* | 11/2003 | Ossia | G06F 3/0238 361/679.09 |
| 2005/0213744 A1* | 9/2005 | Valli | H04M 1/0247 379/368 |
| 2005/0219217 A1* | 10/2005 | Longobardi | G06F 3/04886 345/169 |
| 2006/0279546 A1* | 12/2006 | Karmazyn | G06F 3/0213 345/168 |
| 2010/0134329 A1* | 6/2010 | Wang | G06F 3/0202 341/24 |
| 2013/0141021 A1* | 6/2013 | Tu | G06F 3/0202 318/280 |
| 2013/0201109 A1 | 8/2013 | Knighton et al. | |
| 2015/0253815 A1* | 9/2015 | Hosoya | G06F 3/0227 361/679.1 |
| 2019/0011998 A1* | 1/2019 | Vengrin | G06F 3/0202 |
| 2020/0333887 A1 | 10/2020 | Li | |

FOREIGN PATENT DOCUMENTS

| | | |
|---|---|---|
| CN | 102089728 A | 6/2011 |
| CN | 103513776 A | 1/2014 |
| CN | 206378824 U | 8/2017 |
| TW | 200923621 A | 6/2009 |
| TW | 201830443 A | 8/2018 |
| WO | 2011056462 A | 5/2011 |

OTHER PUBLICATIONS

Search report from China Patent Office dated Oct. 8, 2021 (search report was received for purposes other than patent application review; no corresponding patent application currently filed in China). International Search Report dated Apr. 26, 2022 in corresponding PCT application PCT/CN2022/074469.

* cited by examiner

ELECTRONIC APPARATUS FOR REPOSITIONING AND TRANSITIONING AMONG INPUT DEVICES

CROSS-REFERENCE TO RELATED APPLICATIONS

Provisional application No. 63/144,994 filed on Feb. 3, 2021 and Provisional application No. 63/145,393 filed on Feb. 3, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to the field of computing, and particularly to the field of computer peripheral devices.

Computers are typically used with a combination of input devices in the form a keyboard and a pointing device such as a trackpad, a computer mouse, or a trackball.

Efficient use of such input devices is hindered by the fact that transitioning from using one group of keys to using either the pointing device or another group of keys, and vice versa, often requires disengagement of at least one palm from its location. With a standard full-size keyboard for instance, transitioning from manipulating alphabetical keys to manipulating keys of the numeric keypad requires the right palm to disengage from the vicinity of the alphabetical keys to travel a distance of around 22 millimeters, and vice versa. Meanwhile, transitioning from using a trackpad situated at the right-hand side of said full-size keyboard to using alphabetical keys requires the right palm to disengage from the vicinity of the trackpad to travel a distance of around 33 millimeters, and vice versa. Even with familiarity with the location of the respective keys of the keyboard and the touch sensor and input buttons of the trackpad, the inherently imprecise and inaccurate palm movements involved in such transition often result to misplacement of the fingers, which leads to typing errors and pointing errors. To rectify and avoid these errors, the user often needs to check the horizontal location of the fingers either by touch or by sight and perform adjustments in palm position or finger position. Continually correcting typing and pointing errors and continually checking and adjusting the locations of fingers or palm to avoid such errors represent distractions that negatively impacts user experience and user productivity.

BRIEF SUMMARY OF THE INVENTION

The invention is an electronic apparatus enabling repositioning of at least an input device such that user can transition from using at least one of said input devices to using at least another one of said input devices even while both palms remain continuously engaged to their locations.

The invention addresses the problem that in the course of operating at least one input device, it is often the case that at least one palm needs to repeatedly disengage and travel from its location, which can lead to input errors, rectification and avoidance of which require the user to continually check and adjust the horizontal positions of the palm or fingers until they are appropriately reset.

By precluding the need for any palm to disengage and travel from its location, the invention is expected to reduce typing errors and pointing errors and diminish the need for checking and adjusting the location of the palm or fingers. Errors are expected to be further minimized in the long-term as continual engagement of the palms to a constant reference location enable consistent motion of fingers, which should strengthen muscle memory.

The invention addresses the aforementioned problem by enabling repositioning of at least an input device without needing to disengage any palm from its location.

BRIEF DESCRIPTION OF THE SEVERAL VIEWS OF THE DRAWING(S)

DETAILED DESCRIPTION OF THE INVENTION

Figure 1:
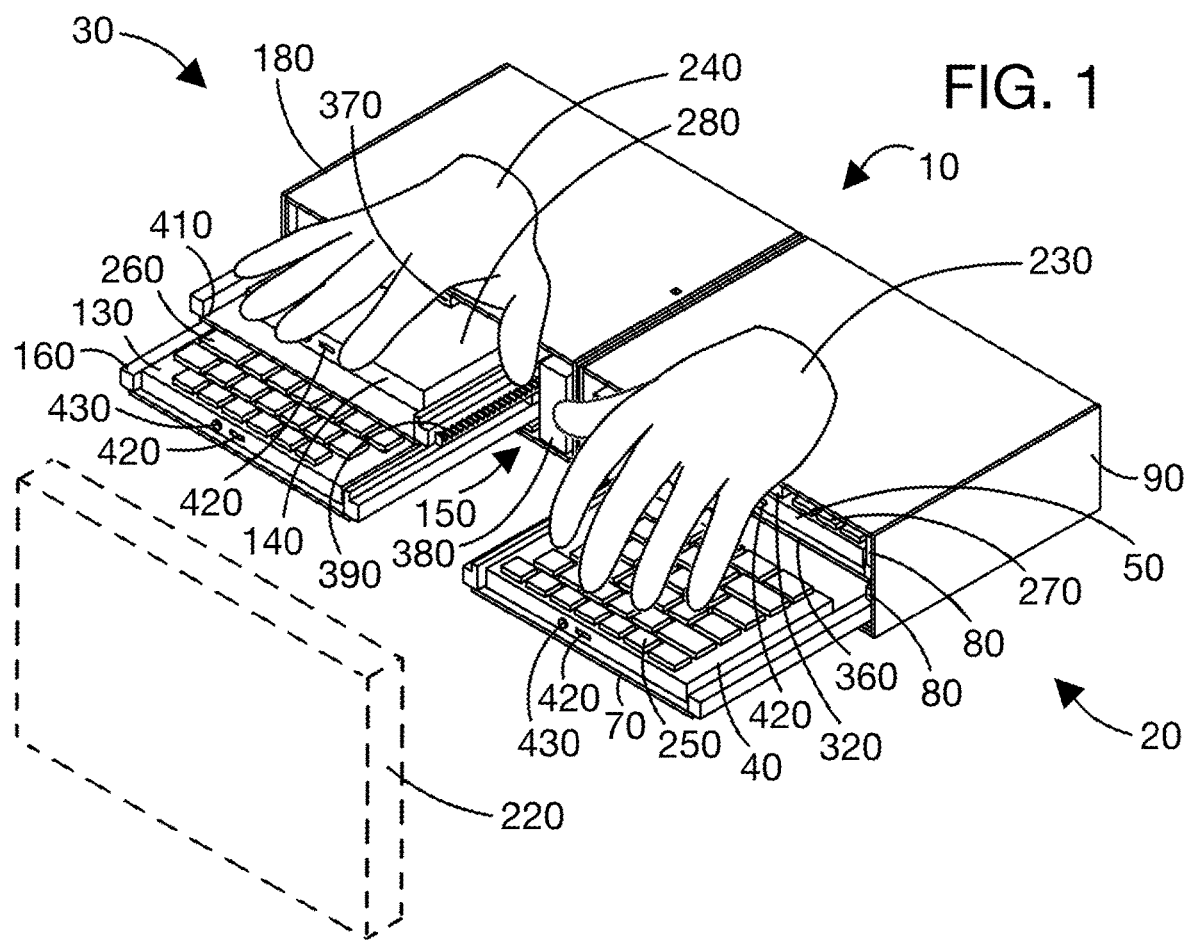
FIG. 1 is a front view of the preferred embodiment of the invention in a use position.

This invention is susceptible to embodiments in different forms and the following description discloses only certain embodiments. Since the description includes some but not all embodiments of the invention, the invention should not be construed as limited to the embodiments described herein. The invention is best defined by the appended claims of this application.

The invention is an electronic apparatus enabling repositioning of at least an input device such that user can transition from using at least one of said input devices to using at least another one of said input devices even while both palms remain continuously engaged to their locations. Input device refers to a device that provides data to an information processing system such as a computer. Examples of input devices are keyboards, keypads, and pointing devices.

FIG. 1 to FIG. 8 shows the invention's preferred embodiment, preferred embodiment 10, which comprises a pair of apparatus, which are apparatus-a 20 and apparatus-b 30. Apparatus-a 20 comprises a pair of input devices, which are left main keyboard 40 and secondary keyboard 50, repositioning mechanism-a 60, bottom tray-a 70, sextet of guides-a 80, housing-a 90, power supply-a 100, hub-a 110, and trio of wirings-a 120. Apparatus-b 30 comprises another pair of input devices, which are right main keyboard 130 and trackpad 140, repositioning mechanism-b 150, bottom tray-b 160, sextet of guides-b 170, housing-b 180, power supply-b 190, hub-b 200, and trio of wirings-b 210. For the purpose of illustrating internal details, a portion of housing-a 90 and a portion of housing-b 180 has been cut away in FIG. 2 to FIG. 7.

Left main keyboard 40, secondary keyboard 50, right main keyboard 130, and trackpad 140 transmit input data to an information processing system in the form of tablet computer 220 through individually paired Bluetooth connections. Repositioning mechanism-a 60 and repositioning mechanism-b 150 reposition and removably secure secondary keyboard 50 and trackpad 140, respectively. Bottom tray-a 70 and bottom tray-b 160 removably secure left main keyboard 40 and right main keyboard 130, respectively. Housing-a 90 secures repositioning mechanism-a 60 and bottom tray-a 70 and serve as palm rest for user's left hand 230. Housing-b 180 secures repositioning mechanism-b 150 and bottom tray-b 160 and serve as palm rest for user's right hand 240. Hub-a 110 and hub-b 200 control repositioning mechanism-a 60 and repositioning mechanism-b 150, respectively. Wirings-a 120 convey power between power supply-a 100 and hub-a 110. Likewise, wirings-b 210 convey power between power supply-b 190 and hub-b 200.

Left main keyboard 40 comprises alphabetical, punctuation, symbol, and modifier keys 250 and resemble the left ⅓ of a standard full-size keyboard. Right main keyboard 130 comprises alphabetical, punctuation, symbol, modifier, and enter keys 260 and resemble the middle ⅓ of a standard full-size keyboard. Secondary keyboard 50 comprises navigation and numeric keys 270 and resemble the right ⅓ of a standard full-size keyboard. Trackpad 140 comprises touch sensor 280 and pair of trackpad input buttons 290. Hub-a 110 and hub-b 200 comprise integrated circuit-a 300 and integrated circuit-b 310, respectively, for data processing and control. Repositioning mechanism-a 60 comprises switch in the form of proximity sensor-a 320, motor-a 330, which is controlled by hub-a 110, an actuator comprising rack-a 340 and pinion-a 350, and top tray-a 360, which removably secures secondary keyboard 50. Likewise, repositioning mechanism-b 150 comprises switch in the form of proximity sensor-b 370, motor-b 380, which is controlled by hub-b 200, an actuator comprising rack-b 390 and pinion-b 400, and top tray-b 410, which removably secures trackpad 140. Wirings-a 120 also convey power between hub-a 110 and motor-a 330 and power and data between hub-a 110 and proximity sensor-a 320 of repositioning mechanism-a 60. Likewise, wirings-b 210 also convey power between hub-b 200 and motor-b 380 and power and data between hub-b 200 and proximity sensor-b 370 of repositioning mechanism-b 150. Top tray-a 360 and top tray-b 410 slide along guides-a 80 and guides-b 170, respectively, which are permanently joined to housing-a 90 and housing-b 180, respectively.

FIG. 1 is a perspective view of preferred embodiment 10 in a use position. Left main keyboard 40 is being manipulated by user's left hand 230 while trackpad 140 is in the process of being repositioned through activation of proximity sensor-b 370.

Figure 2:
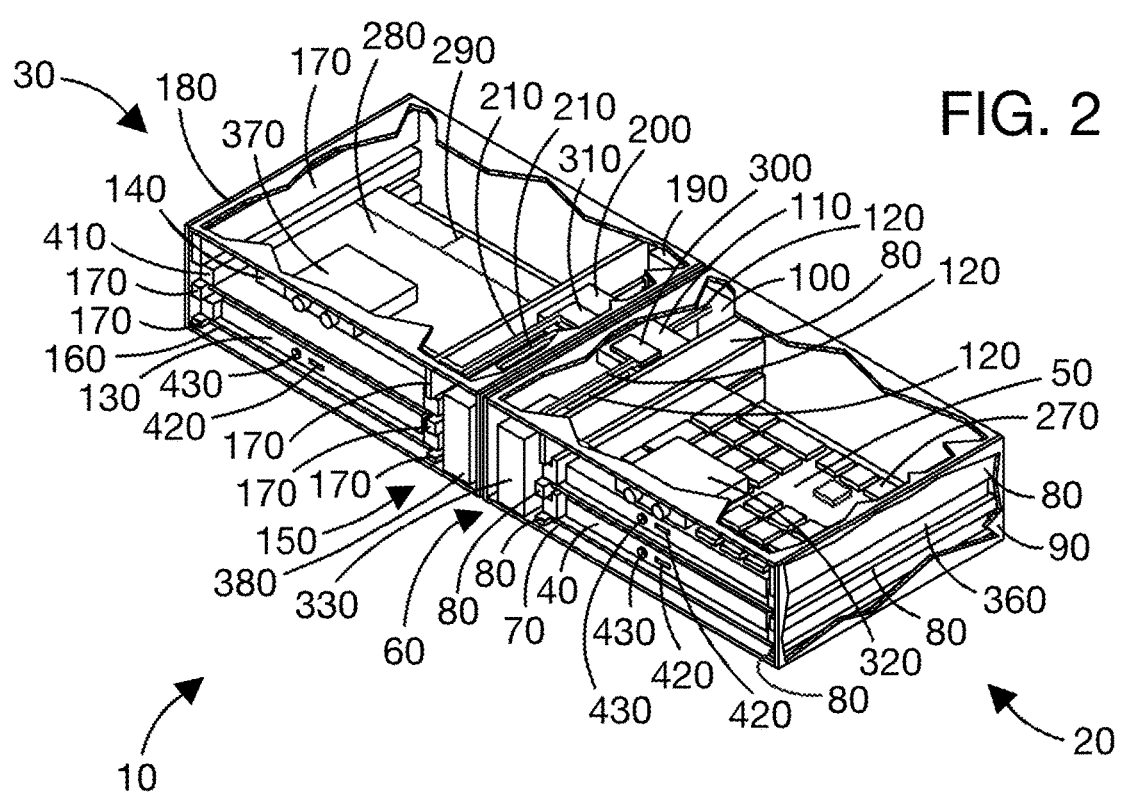
FIG. 2 is a perspective view of the embodiment recited in FIG. 1 in disuse.

FIG. 2 is a perspective view of preferred embodiment 10 in disuse. As illustrated, left main keyboard 40 and secondary keyboard 50 are repositioned for disuse inside of housing-a 90. Likewise, right main keyboard 130 and trackpad 140 are repositioned for disuse inside of housing-b 180.

Figure 3:
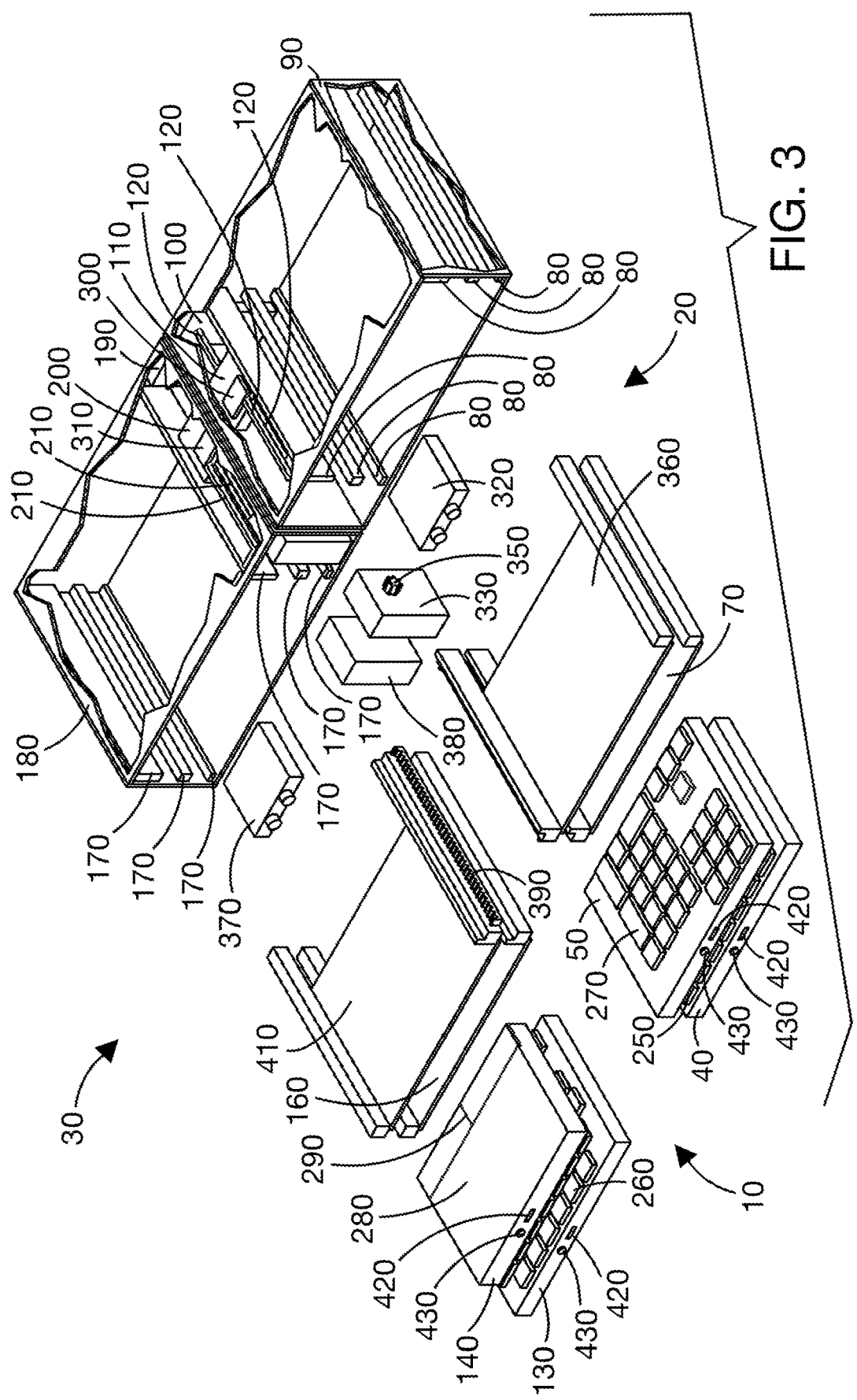
FIG. 3 is an exploded perspective view of the embodiment recited in FIG. 1.

FIG. 3 is an exploded perspective view of preferred embodiment 10, which is shown in more detail.

Figure 4:
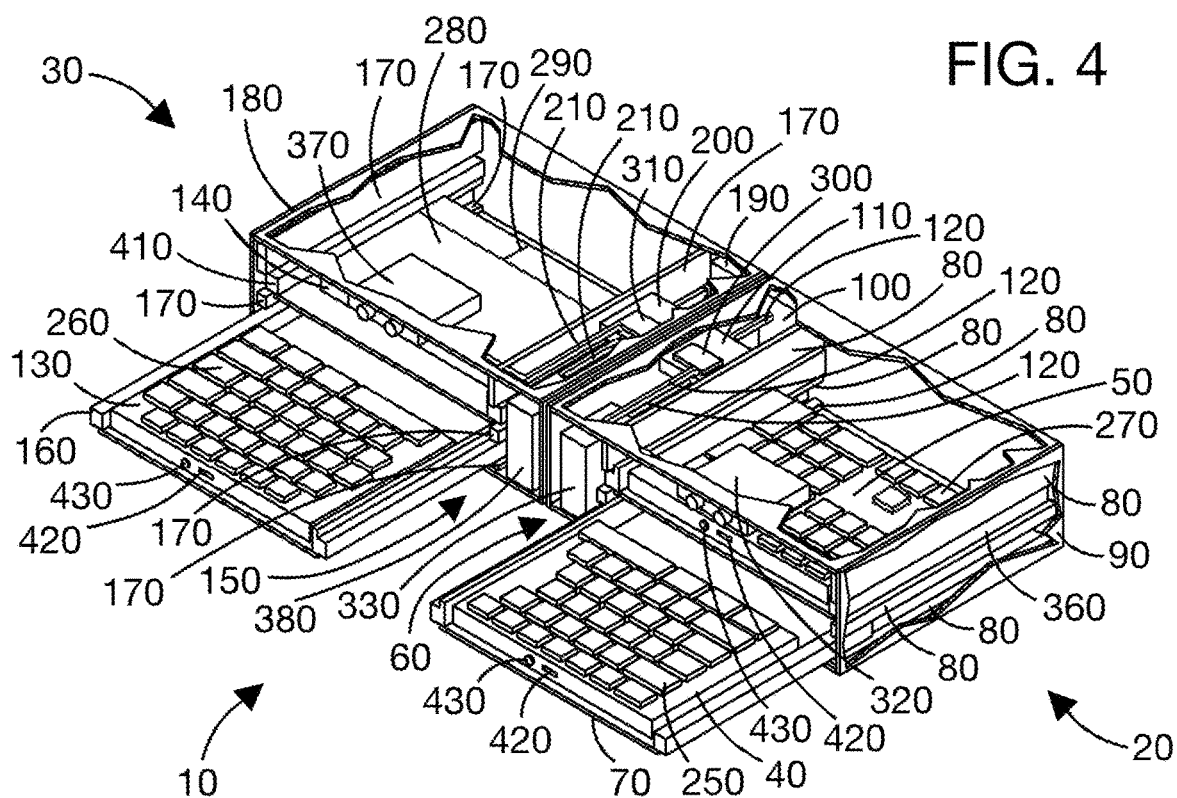
FIG. 4 is a perspective view of the embodiment recited in FIG. 1 illustrating left main keyboard and right main keyboard repositioned for use.
Figure 5:
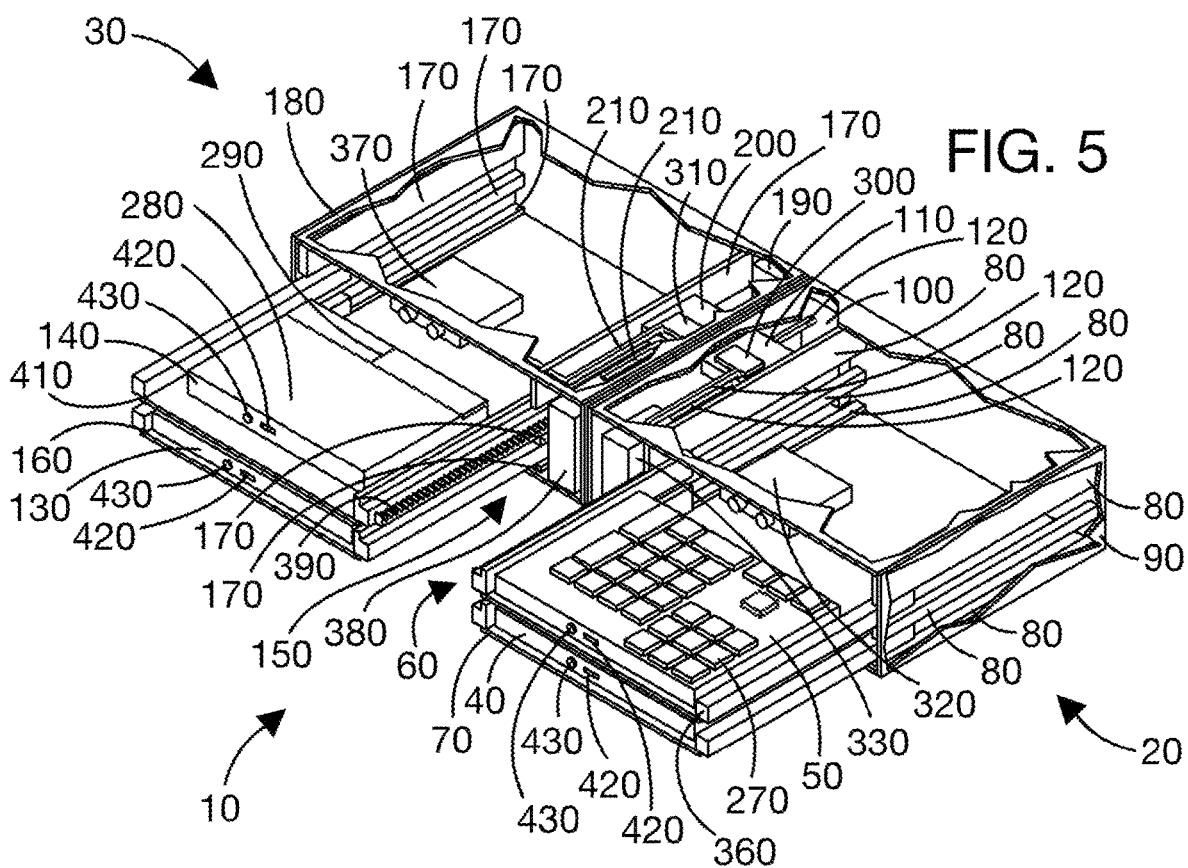
FIG. 5 is a perspective view of the embodiment recited in FIG. 1 illustrating secondary keyboard and trackpad repositioned for use.
Figure 6:
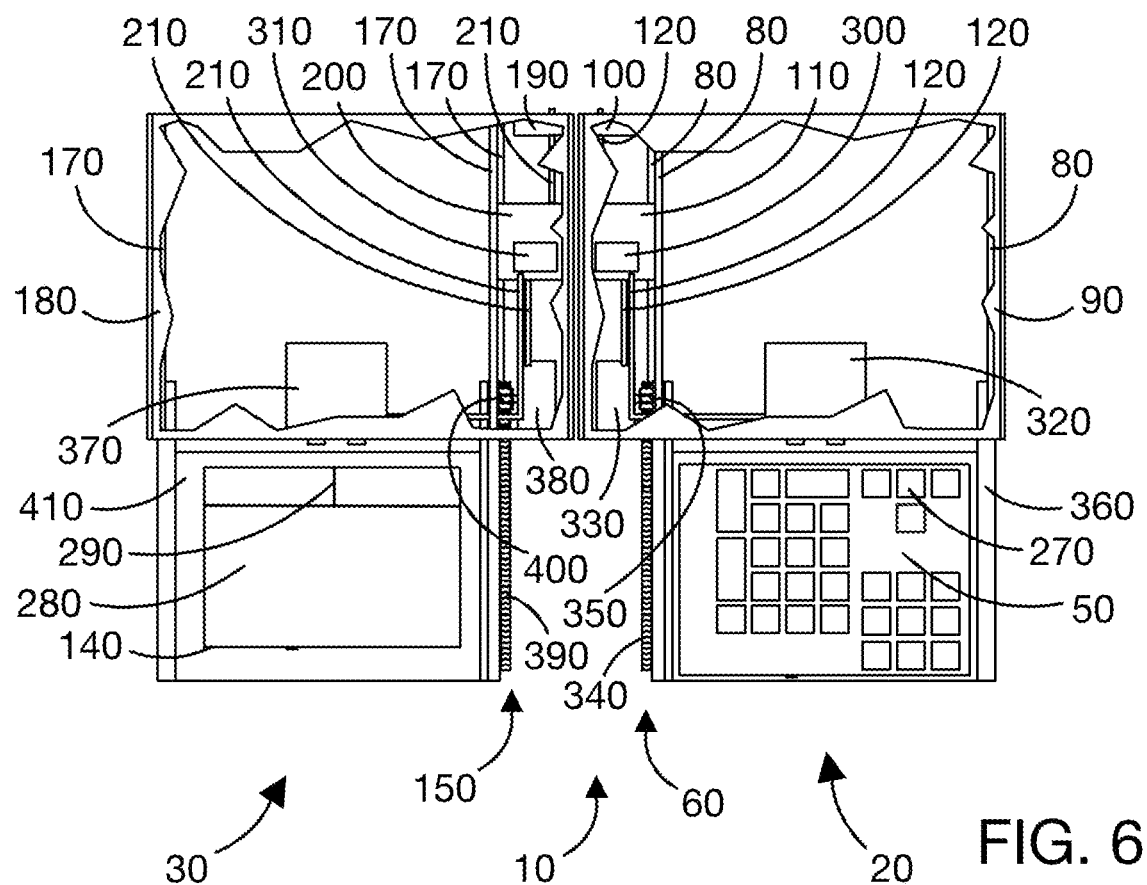
FIG. 6 is a top view of the embodiment recited in FIG. 1 illustrating secondary keyboard and trackpad repositioned for use.
Figure 7:
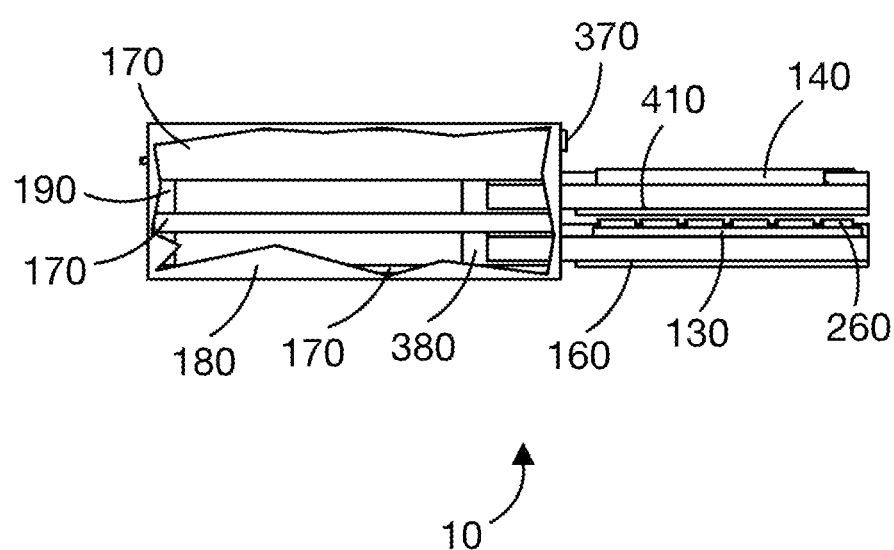
FIG. 7 is a side view of the embodiment recited in FIG. 1 illustrating secondary keyboard and trackpad repositioned for use.
Figure 8:
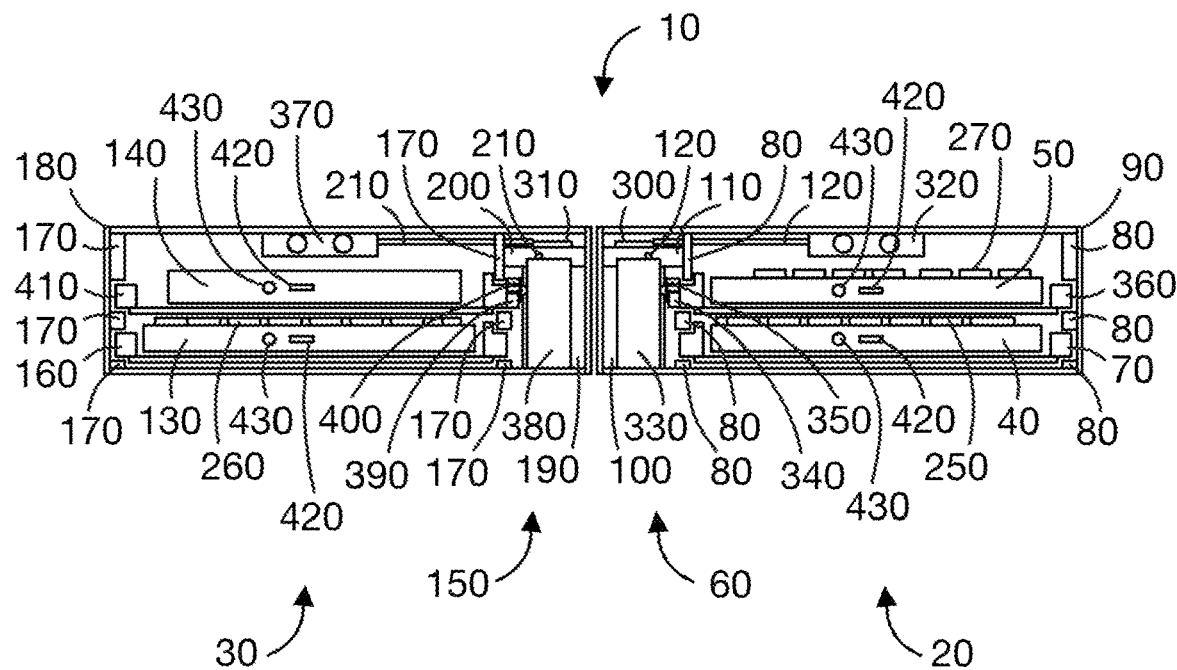
FIG. 8 is a front view of the embodiment recited in FIG. 1.

FIG. 4 is a perspective view of preferred embodiment 10 illustrating left main keyboard 40 and right main keyboard 130 repositioned for use outside of housing-a 90 and housing-b 180, respectively, as part of setup process prior to operation. Bottom tray-a 70 and bottom tray-b 160 had been manually pulled out along guides-a 80 and guides-b 170 priorly so as to receive left main keyboard 40 and right main keyboard 130, respectively. Housing-a 90 and housing-b 180 had been intentionally aligned by user as desired. Apparatus-a 20 and apparatus-b 30 have been powered so that through wirings-a 120 and wirings-b 210, hub-a 110 and hub-b 200 can draw power from power supply-a 100 and power supply-b 190. Left main keyboard 40, secondary keyboard 50, right main keyboard 130, and trackpad 140 which are rechargeable, have been recharged through respective micro-usb ports 420 and paired with tablet computer 220 through respective Bluetooth pairing buttons 430.

Following completion of set up, different configurations of the relative arrangement of input devices determine which one or two are available for use at any given time. Left main keyboard 40 and right main keyboard 130 are available for use when secondary keyboard 50 and trackpad 140 are repositioned for disuse inside of housing-a 90 and housing-b 180, respectively, as illustrated in FIG. 4.

FIG. 5, FIG. 6, FIG. 7 and FIG. 8 illustrate in perspective view, top view, side view, and front view, respectively, that secondary keyboard 50 and trackpad 140 are available for use when both are repositioned outside of housing-a 90 and housing-b 180, respectively. Secondary keyboard 50 can be used simultaneously with either trackpad 140 or right main keyboard 130, while trackpad 140 can be used simultaneously with either secondary keyboard 50 or left main keyboard 40. Left main keyboard 40 can be used simultaneously with either right main keyboard 130 or trackpad 140, while right main keyboard 130 can be used simultaneously with either left main keyboard 40 or secondary keyboard 50.

Repositioning mechanism-a 60 and repositioning mechanism-b 150 repeatedly reconfigure the arrangement of input devices. First signal from proximity sensor-a 320 is sent through wirings-a 120 to hub-a 110, which causes motor-a 330 to drive pinion-a 350, which moves rack-a 340, which causes top tray-a 360 to slide along guides-a 80 until secondary keyboard 50 is repositioned for use outside of housing-a 90 and over left main keyboard 40. Likewise, first signal from proximity sensor-b 370 is sent through wirings-b 210 to hub-b 200, which causes motor-b 380 to drive pinion-b 400, which moves rack-b 390, which causes top tray-b 410 to slide along guides-b 170 until trackpad 140 is repositioned for use outside of housing-b 180 and over right main keyboard 130. In a similar fashion, second signal from proximity sensor-a 320 causes top tray-a 360 and secondary keyboard 50 to be repositioned for disuse inside housing-a 90 and second signal from proximity sensor-b 370 causes top tray-b 410 and trackpad 140 to be repositioned for disuse inside housing-b 180. Proximity sensor-a 320 and proximity sensor-b 370 are triggered by user without needing to disengage any palm from its location. User triggers proximity sensor-a 320 by simply lifting fingers of left hand 230 until proximity sensor-a 320 does not detect any obstruction in its path, thereby also preventing collision between left hand 230 and top tray-a 360. Likewise, user triggers proximity sensor-b 370 by simply lifting the fingers of right hand 240 until proximity sensor-b 370 does not detect any obstruction in its path, thereby also preventing collision between right hand 240 and top tray-b 410.

On the basis of such minimal hand movements, repositioning mechanism-a 60 and repositioning mechanism-b 150 alternately reposition for use and disuse input devices in the form of secondary keyboard 50 and trackpad 140 such that user can transition from using at least one of said input devices, which additionally comprise left main keyboard 40 and right main keyboard 130, to using at least another one of said input devices even while both palms remain continuously engaged to their locations. Furthermore, repositioning mechanism-a 60 and repositioning mechanism-b 150 enable each of alphabetical, punctuation, symbol, and modifier keys 250 of left main keyboard 40, each of alphabetical, punctuation, symbol, modifier, and enter keys 260 of right main keyboard 130, each of navigation and numeric keys 270 of secondary keyboard 50, each of trackpad input buttons 290, and touch sensor 280 of trackpad 140 to become accessible and therefore manipulable to user even while both palms remain continuously engaged to their locations. If at any particular point in time a certain key of left main keyboard 40, right main keyboard 130, or secondary keyboard 50, a certain trackpad input button 290, or touch sensor 280 is required but not immediately manipulable, user simply needs to trigger proximity sensor-a 320 or proximity sensor-b 370 until requirement is satisfied. At no point after completion of set up does user need to disengage any palm from its location for the purpose of operating preferred embodiment 10.

With both palms continuously engaged to their locations during the entire operation of preferred embodiment 10, inherently imprecise and inaccurate palm movements that often result to misplacement of the fingers are precluded. Preferred embodiment 10 is therefore expected to reduce typing errors and pointing errors and lessen the need for continually checking and adjusting the position of fingers or palm. Minimization of such distractions are expected to enhance user experience and user productivity.

The preferred mode of manufacturing preferred embodiment 10 is assembly of fabricated metal and plastic parts. Input devices may be removably secured through any of various means, including removable adhesive, magnetism, or mechanical fastener.

Figure 9:
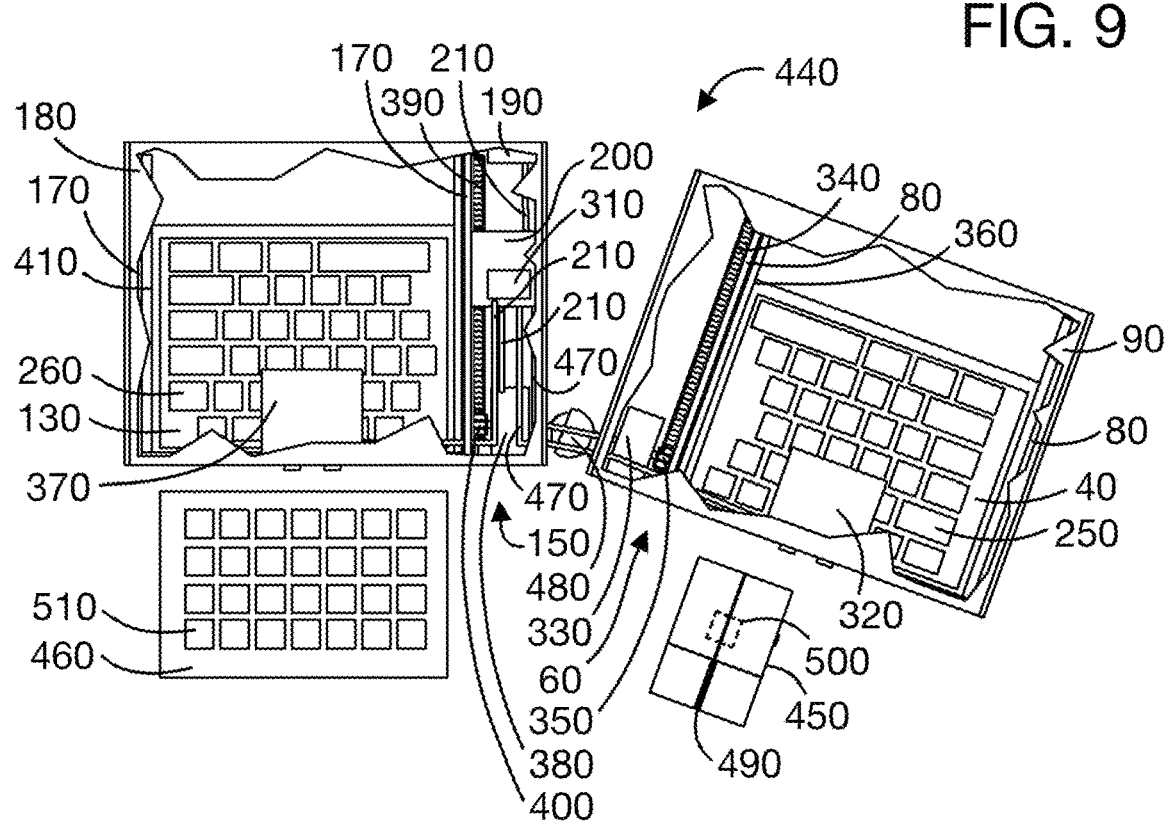
FIG. 9 is a top view of alternative embodiment that comprises a macro keyboard and a computer mouse.
Figures 10, 11:
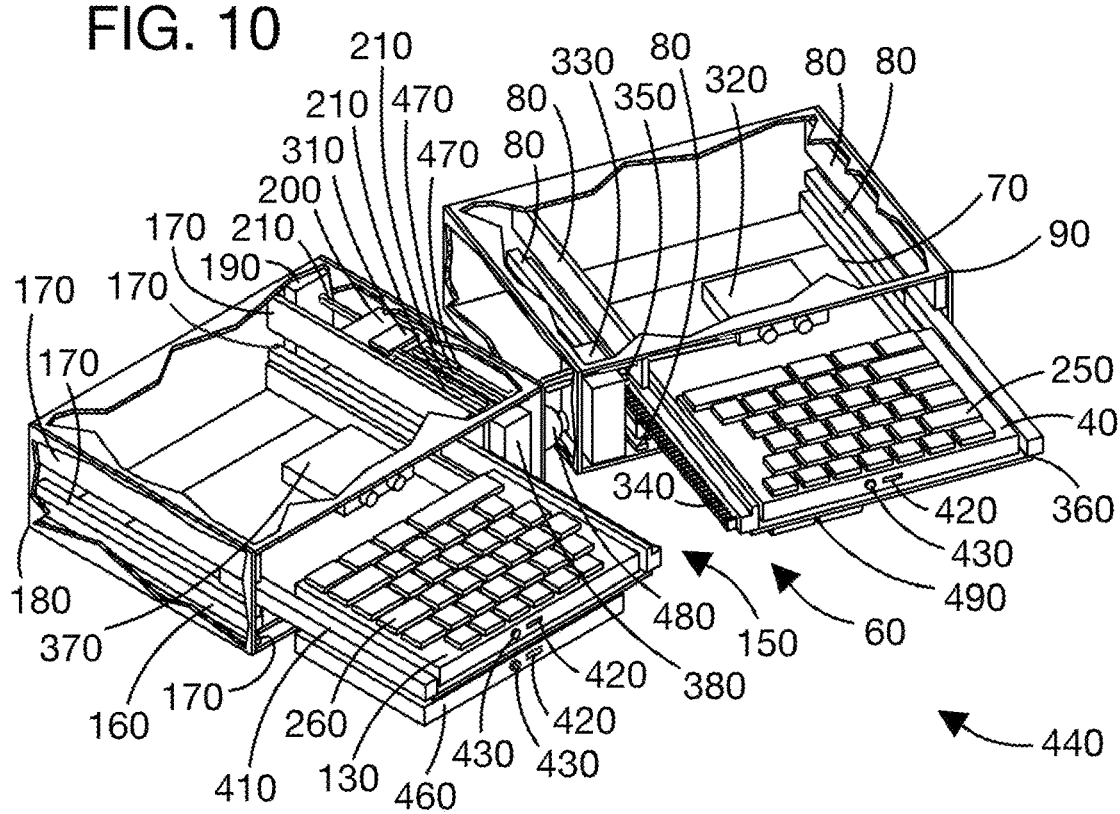
FIG. 10 is a perspective view of the embodiment recited in FIG. 9.
FIG. 11 is a rear perspective view of another embodiment that comprises a whole main keyboard.

FIG. 9 and FIG. 10 show in top view and perspective view, respectively, alternative embodiment 440 that would have been similar to preferred embodiment 10 except for comprising input devices in the form of computer mouse 450 and macro keyboard 460 instead of secondary keyboard 50 and trackpad 140 and pair of wirings-ab 470 instead of wirings-a 120, additionally comprising ball-and-socket joint 480, which pivotally joins housing-a 90 and housing-b 180 to each other, and missing hub-a 110 and power supply-a 100.

Computer mouse 450, which is freestanding in front of housing-a 90, comprises pair of mouse input buttons 490 and optical sensor 500 for detecting movement and is short enough so as not to collide with top tray-a 360. Macro keyboard 460, which is freestanding in front of housing-b 180, comprises macro keys 510 for keying shortcuts of sequences of keystrokes or menu actions and is short enough so as not to collide with top tray-b 410. Housing-a 90 and housing-b 180, portions of which have been cut away for purpose of illustration, had been intentionally misaligned by user to achieve desired angle through operation of ball-and-socket joint 480. Hub-b 200 controls repositioning mechanism-a 60 as wirings-ab 470 convey power between hub-b 200 and motor-a 330 and power and data between hub-b 200 and proximity sensor-a 320.

FIG. 10 illustrates in perspective view that secondary keyboard 50 and trackpad 140 had been swapped for left main keyboard 40 and right main keyboard 130, respectively, which are removably secured by top tray-a 360 and top tray-b 410, respectively, and repositioned outside housing-a 90 and housing-b 180. Right main keyboard 130 is bigger than trackpad 140 but is nonetheless removably secured as top tray-a 360 of repositioning mechanism-a 60 accommodates variation in geometric property of input devices.

Repositioning mechanism-a 60 and repositioning mechanism-b 150 reposition alternately for use and disuse input devices in the form of left main keyboard 40 and right main keyboard 130, respectively, such that user can transition from using at least one of said input devices, which additionally comprise computer mouse 450 and macro keyboard 460, to using at least another one of said input devices even while both palms remain continuously engaged to their locations. Furthermore, repositioning mechanism-a 60 and repositioning mechanism-b 150 enable each of alphabetical, punctuation, symbol, and modifier keys 250 of left main keyboard 40, each of alphabetical, punctuation, symbol, modifier, and enter keys 260 of right main keyboard 130, each of macro keys 510 of macro keyboard 460, each of mouse input buttons 490, and optical sensor 500 of computer mouse 450 to become manipulable to user even while both palms remain continuously engaged to their locations. Optical sensor 500 is manipulated by moving computer mouse 450.

Figure 12:
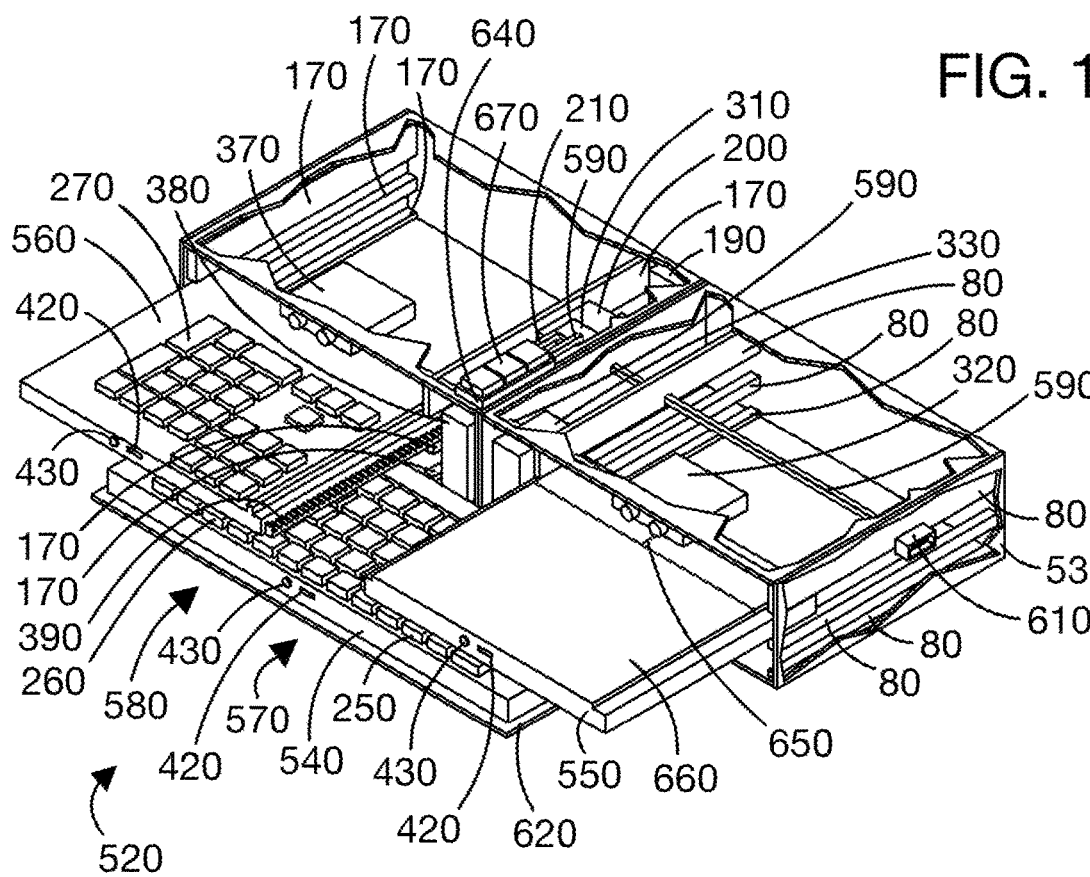
FIG. 12 is a perspective view of the embodiment recited in FIG. 11.
Figure 13:
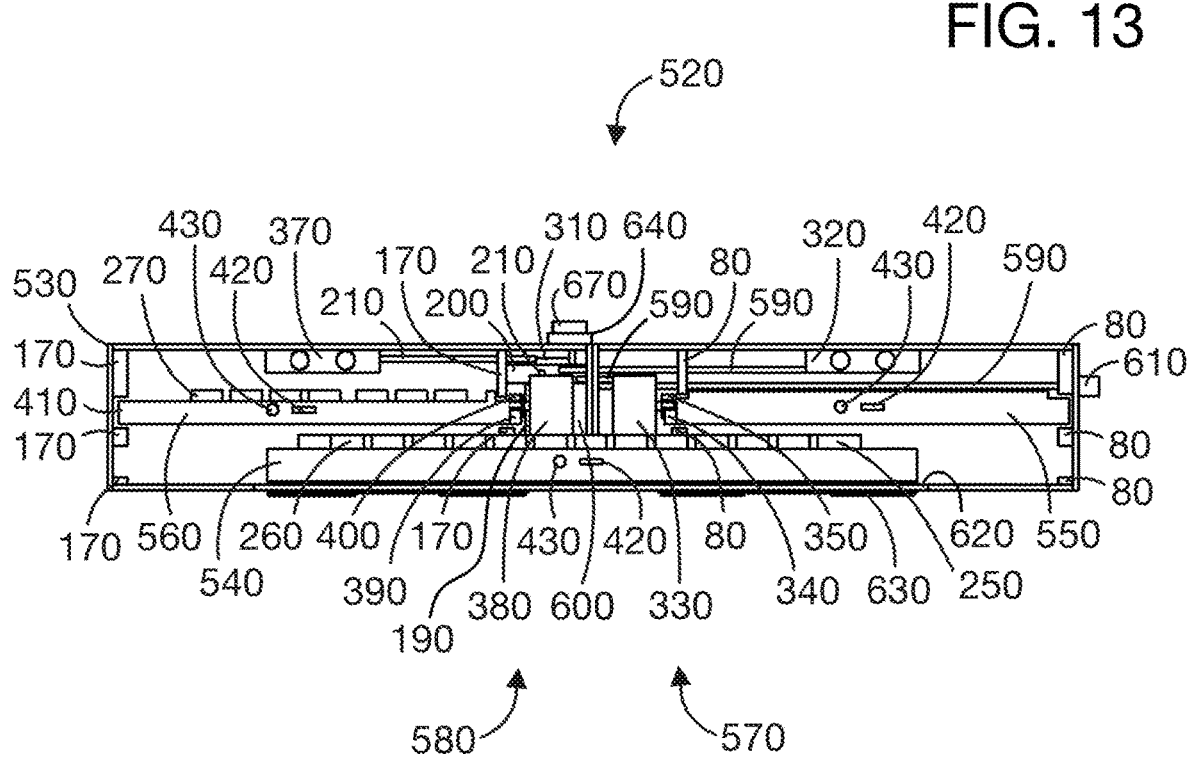
FIG. 13 is a front view of the embodiment recited in FIG. 11.
Figure 14:
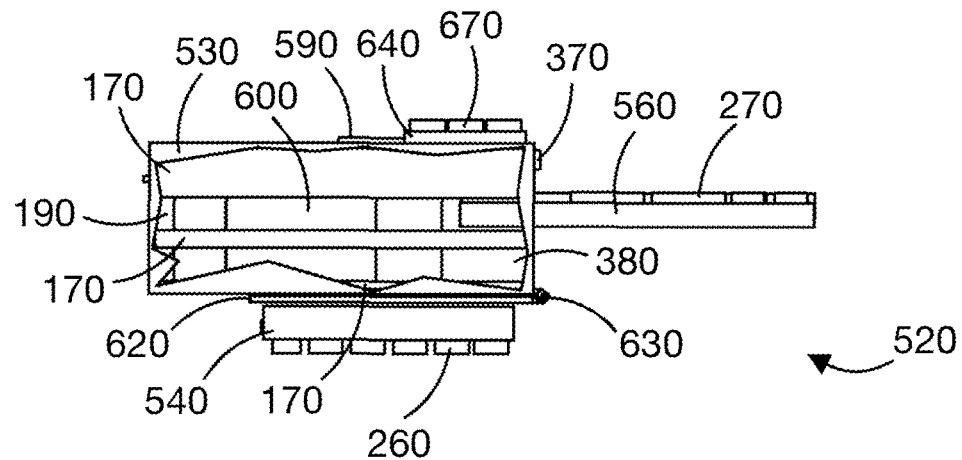
FIG. 14 is a side view of the embodiment recited in FIG. 11.

FIG. 11 and FIG. 12 show in perspective views, FIG. 13 shows in front view, and FIG. 14 shows in side view another embodiment 520, which would have been similar to preferred embodiment 10 except for comprising housing-c 530 instead of housing-a 90 and housing-b 180, input devices in the form of whole main keyboard 540, widened trackpad 550, and widened secondary keyboard 560 instead of left main keyboard 40, right main keyboard 130, secondary keyboard 50, and trackpad 140, repositioning mechanism-c 570 and repositioning mechanism-d 580 instead of repositioning mechanism-a 60 and repositioning mechanism-b 150, and quartet of wirings-c 590 instead of wirings-a 120, additionally comprising internal computer 600, HDMI port 610, plate-c 620, hinges-c 630, and memory keypad 640, and missing hub-a 110, power supply-a 100, bottom tray-a 70, and bottom tray-b 160.

Housing-c 530 is essentially a union of housing-a 90 and housing-b 180 and is joined to both repositioning mechanism-c 570 and repositioning mechanism-d 580. For purpose of illustrating internal details, portions of housing-c 530 have been cut away. Repositioning mechanism-c 570 and repositioning mechanism-d 580 are similar to repositioning mechanism-a 60 and repositioning mechanism-b 150, except for missing top tray-a 360 and top tray-b 410, which are obviated as widened trackpad 550 and widened secondary keyboard 560 are permanently joined to pinion-a 350 and pinion-b 400, respectively. Widened trackpad 550 comprises pair of widened trackpad input buttons 650 and widened touch sensor 660. Widened secondary keyboard 560 comprises navigation and numeric keys 270 and is similar to secondary keyboard 50 except for being wider. Whole main keyboard 540, which resembles the left ⅔ of a standard full-size keyboard and is essentially a union of left main keyboard 40 and right main keyboard 130, comprises alphabetical, punctuation, symbol, and modifier keys 250 and alphabetical, punctuation, symbol, modifier, and enter keys 260. Whole main keyboard 540 is removably joined to plate-c 620, which is pivotally joined to housing-c 530 through hinges-c 630 with 180-degree range of motion. Whole main keyboard 540, widened trackpad 550, and widened secondary keyboard 560 do not directly transmit input data to tablet computer 220 or internal computer 600 but instead automatically reestablish pre-paired Bluetooth connections to hub-b 200 without user involvement once powered on. Whole main keyboard 540, widened trackpad 550, and widened secondary keyboard 560 wirelessly transmit input data to hub-b 200, which also controls repositioning mechanism-c 570 and repositioning mechanism-d 580 and transmits input data to internal computer 600. Internal computer 600 has been integrated with hub-b 200 such that internal computer 600 derives power from hub-b 200 and automatically recognizes input data provided by hub-b 200. Memory keypad 640 comprises memory plus, memory recall, and memory minus input buttons 670 for memorizing the last pressed key, recalling the memorized key, and forgetting the memorized key, respectively. Memory keypad 640 is constantly available for use due to being medially located near both left thumb and right thumb and enables reduction in the frequency of required reconfiguration of the arrangement of input devices by providing immediate access to a frequently required keystroke from a less frequently used input device. Wirings-c 590 convey power between hub-b 200 and motor-a 330 and power and data between hub-b 200 and proximity sensor-a 320 and memory keypad 640. Wirings-c 590 also convey data between internal computer 600 and HDMI port 610.

FIG. 11 illustrates that repositioning mechanism-c 570 and repositioning mechanism-d 580 have repositioned widened trackpad 550 and widened secondary keyboard 560 for disuse inside of housing-c 530.

FIG. 12 illustrates that repositioning mechanism-c 570 and repositioning mechanism-d 580 have subsequently repositioned widened trackpad 550 and widened secondary keyboard 560 for use outside of housing-c 530 and above whole main keyboard 540.

FIG. 13 illustrates that widened trackpad 550 and widened secondary keyboard 560 are movably held by guides-a 80 and guides-b 170, respectively, and that memory keypad 640 is joined to the top of housing-c 530.

FIG. 14 illustrates whole main keyboard 540 manually repositioned for disuse under housing-c 530 through pivoting of plate-c 620 along hinges-c 630.

Repositioning mechanism-c 570 and repositioning mechanism-d 580 reposition alternately for use and disuse input devices in the form of widened trackpad 550 and widened secondary keyboard 560, respectively, such that user can transition from using at least one of said input devices, which additionally comprise whole main keyboard 540 in front of housing-c 530, to using at least another one of said input devices even while both palms remain continuously engaged to their locations. Furthermore, repositioning mechanism-a 60 and repositioning mechanism-b 150 enable each of alphabetical, punctuation, symbol, and modifier keys 250 and each of alphabetical, punctuation, symbol, modifier, and enter keys 260 of whole main keyboard 540, each of navigation and numeric keys 270 of widened secondary keyboard 560, each of widened trackpad input buttons 650, and widened touch sensor 660 of widened trackpad 550 to become manipulable to user even while both palms remain continuously engaged to their locations.

Figure 15:
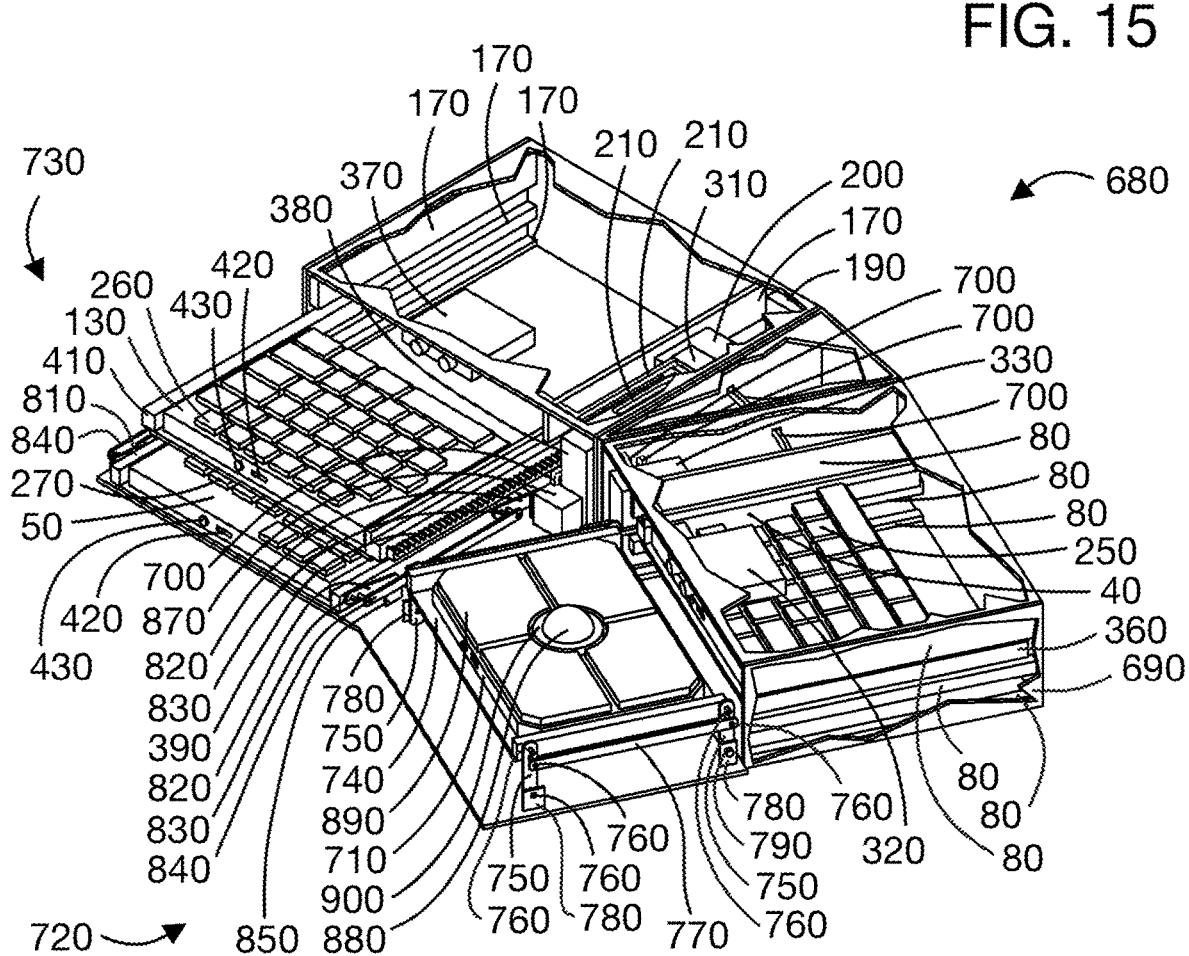
FIG. 15 is a perspective view of an additional embodiment comprising a trackball.
Figure 16:
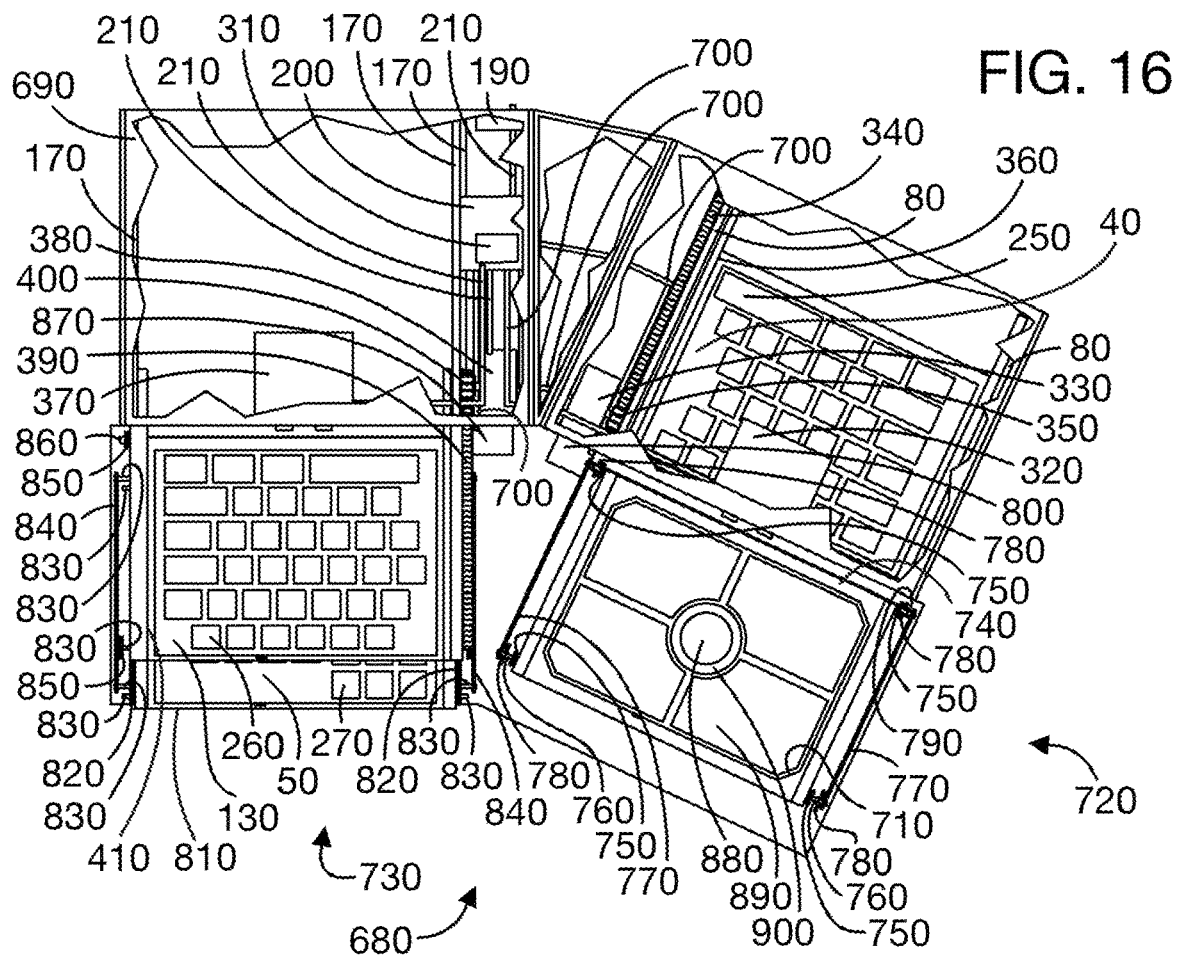
FIG. 16 is a top view of the embodiment recited in FIG. 15.
Figure 17:
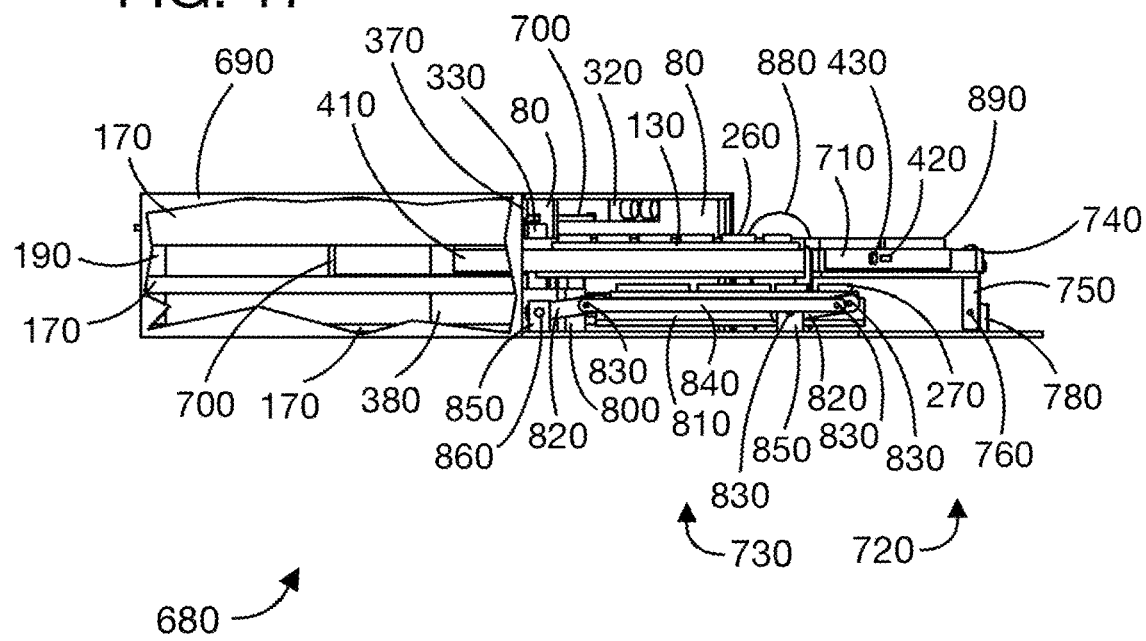
FIG. 17 is a side view of the embodiment recited in FIG. 15.

FIG. 15, FIG. 16, and FIG. 17 show in perspective view, top view, and side view, respectively, additional embodiment 680, which would have been similar to preferred embodiment 10 except for comprising housing-d 690 instead of housing-a 90 and housing-b 180, quartet of wirings-d 700 instead of wirings-a 120, input device in the form of trackball 710 instead of trackpad 140, additionally comprising repositioning mechanism-e 720 and repositioning mechanism-f 730, and missing hub-a 110, power supply-a 100, bottom tray-a 70, and bottom tray-b 160.

Repositioning mechanism-e 720 alternately repositions trackball 710 for use at the immediately preceding location of left main keyboard 40 and for disuse below left main keyboard 40. Likewise, repositioning mechanism-f 730 alternately repositions secondary keyboard 50 for use at the immediately preceding location of right main keyboard 130 and for disuse below right main keyboard 130. Repositioning mechanism-e 720 comprises switch in the form of proximity sensor-a 320, tray-e 740, quartet of levers-e 750, decade of pins-e 760, pair of bars-e 770, quartet of swivels-e 780, shaft-e 790, and motor-e 800, which is controlled by hub-b 200 and joined to shaft-e 790, which is joined to rear pair of quartet of levers-e 750. Likewise, repositioning mechanism-f 730 comprises switch in the form of proximity sensor-b 370, tray-f 810, quartet of levers-f 820, decade of pins-f 830, pair of bars-f 840, quartet of swivels-f 850, shaft-f 860, and motor-f 870, which is controlled by hub-b 200 and joined to shaft-f 860, which is joined to rear pair of quartet of levers-f 820. Swivels-e 780, swivels-f 850, motor-e 800, and motor-f 870 are all joined to housing-d 690, portions of which have been cut away for purpose of illustration. Levers-e 750 are pivotally joined to bars-e 770 by pins-e 760 and pivot in tandem along swivels-e 780 as shaft-e 790 is rotated by motor-e 800. Likewise, quartet of levers-f 820 are pivotally joined to bars-f 840 by pins-f 830 and pivot in tandem along swivels-f 850 as shaft-f 860 is rotated by motor-f 870. Secondary keyboard 50 and trackpad 140 had been swapped for left main keyboard 40 and right main keyboard 130, which are now removably secured by top tray-a 360 and top tray-b 410, respectively. Tray-e 740 and tray-f 810 removably secure trackball 710 and secondary keyboard 50, respectively, and are pivotally joined to quartet of levers-e 750 and quartet of levers-f 820, respectively, by pins-e 760 and pins-f 830. Hub-b 200 controls repositioning mechanism-a 60, repositioning mechanism-e 720, and repositioning mechanism-f 730. Wirings-d 700 convey power between hub-b 200 and motor-a 330, motor-e 800, and motor-f 870 and power and data between hub-b 200 and proximity sensor-a 320.

As illustrated, trackball 710, which comprises ball 880, quartet of trackball input buttons 890, and ball-sensor 900 for detecting rotation of ball 880, occupies the location where left main keyboard 40 would otherwise be had left main keyboard 40 been repositioned for use. In fact, trackball 710 is currently repositioned for use at the immediately preceding location of left main keyboard 40, which has been repositioned for disuse inside of housing-d 690 and therefore vacated its previous position. Second signal from proximity sensor-a 320 has caused hub-b 200 to reposition left main keyboard 40 for disuse inside housing-d 690 and then drive motor-e 800 to rotate shaft-e 790 until quartet of levers-e 750 are pivoted to vertical position thereby elevating tray-e 740 until trackball 710 occupies the location vacated by left main keyboard 40. Meanwhile, right main keyboard 130 occupies the location where secondary keyboard 50 would otherwise be had secondary keyboard 50 been repositioned for use. In fact, right main keyboard 130 is currently repositioned for use at the immediately preceding location of secondary keyboard 50, which has been repositioned for disuse and therefore vacated its previous position. First signal from proximity sensor-b 370 has caused hub-b 200 to drive motor-f 870 to rotate shaft-f 860 until quartet of levers-f 820 are pivoted about 80 degrees from vertical position thereby fully descending tray-f 810 and secondary keyboard 50 and then reposition right main keyboard 130 for use outside of housing-d 690 at the location vacated by secondary keyboard 50.

Repositioning mechanism-a 60, repositioning mechanism-e 720, repositioning mechanism-b 150, and repositioning mechanism-f 730, reposition alternately for use and disuse input devices in the form of left main keyboard 40, trackball 710, right main keyboard 130, and secondary keyboard 50, respectively, such that user can transition from using at least one of said input devices to using at least another one of said input devices even while both palms remain continuously engaged to their locations. Furthermore, repositioning mechanism-a 60, repositioning mechanism-e 720, repositioning mechanism-b 150, and repositioning mechanism-f 730 enable each alphabetical, punctuation, symbol, and modifier keys 250 of left main keyboard 40, each of alphabetical, punctuation, symbol, modifier, and enter keys 260 of right main keyboard 130, each of navigation and numeric keys 270 of secondary keyboard 50, each of trackball input buttons 890, and ball-sensor 900 of trackball 710 to become manipulable to user even while both palms remain continuously engaged to their locations. Ball-sensor 900 is manipulated by operating ball 880.

As this invention is susceptible to embodiments in different forms, various features could have been added, removed, modified, or replaced within the principle and scope of the invention. For instance, automatic wireless charging capability could have been incorporated by incorporating an internal wireless charger transmitter that is joined to a power supply and a built-in wireless charger receiver inside an input device. Also, an input device could have been designed to transmit data to a hub through a cable instead of through pre-paired Bluetooth connections and likewise, a hub could have been designed to transmit data to an external computer through a cable instead of wirelessly. Input devices, being removably secured, could have been reversed in orientation and manipulated by the user as each palm is located in front of a housing instead of on the top surface of a housing. In such case, a repositioning mechanism could have been designed to activate when a button is pressed instead of when a proximity sensor is triggered.

I claim:

1. An electronic apparatus comprising:
    a first housing portion comprising
        a first input device being able to transition between a first use position and a first disuse position;
        a first repositioning mechanism capable of transitioning said first input device between said first use position and said first disuse position;
        a first switch positioned above said first input device, said first switch being capable of activating said first repositioning mechanism for transitioning said first input device between said first use position and said first disuse position; and
        a first palm housing position; and
    a second housing portion comprising
        a second input device being able to transition between a second use position and a second disuse position;
        a second repositioning mechanism capable of transitioning said second input device between said second use position and said second disuse position;
        a second switch positioned above said second input device, said second switch being capable of activating said second repositioning mechanism for transitioning said second input device between said second use position and said second disuse position; and
        a second palm housing position;
        wherein a user can thereby activate said first switch and said second switch while a first palm is continuously engaged with said first palm housing position and while a second palm is continuously engaged with said second palm housing position.

2. The electronic apparatus of claim 1, wherein said first repositioning mechanism accommodates variation in geometric property of said first input device.

3. The electronic apparatus of claim 1, wherein each key, each input button, and each sensor of said first input device and said second input device is manipulable to said user even while said first palm and said second palm remain continuously engaged.

4. The electronic apparatus of claim 1, further comprising a computer operable on by said first input device.

5. The electronic apparatus of claim 1, wherein said first input device can be swapped for a further input device.

6. The electronic apparatus of claim 1, wherein said first input device is a keyboard or a macro keyboard.

7. The electronic apparatus of claim 1, wherein said first input device comprises numeric keys.

8. The electronic apparatus of claim 1, wherein said first input device is a pointing device.

9. The electronic apparatus of claim 8, wherein said pointing device is a trackpad or a mouse.

10. The electronic apparatus of claim 1, wherein said first repositioning mechanism comprises an actuator conveying said first input device and a motor driving said actuator.

11. The electronic apparatus of claim 10, wherein said first switch comprises a sensor.

12. The electronic apparatus of claim 1, wherein said first use position is outside of said first housing portion and said first disuse position is inside of said first housing portion.

13. The electronic apparatus of claim 12, wherein said first housing portion is movably joined to and can be rearranged relative to said second housing portion.

14. A method for making the electronic apparatus of claim 1, said method comprising steps of:
    providing said first repositioning mechanism and said first input device; and
    assembling said first switch above said first input device;
    wherein said first repositioning mechanism is assembled with an actuator conveying said first input device and a motor for driving said actuator.

* * * * *